US012516956B2

(12) United States Patent
Kothari et al.

(10) Patent No.: US 12,516,956 B2
(45) Date of Patent: Jan. 6, 2026

(54) SYSTEMS AND METHODS FOR PERFORMING DATA COLLECTION MISSIONS

(71) Applicant: Volkswagen Group of America Investments, LLC, Reston, VA (US)

(72) Inventors: Parul Kothari, New York, NY (US); John Drake, Cranbury, NJ (US); Timothy James Douglas, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 111 days.

(21) Appl. No.: 17/652,991

(22) Filed: Mar. 1, 2022

(65) Prior Publication Data

US 2023/0280180 A1    Sep. 7, 2023

(51) Int. Cl.
*G01C 21/00*   (2006.01)
*B60W 50/02*   (2012.01)
*B60W 60/00*   (2020.01)

(52) U.S. Cl.
CPC ..... *G01C 21/3837* (2020.08); *B60W 50/0205* (2013.01); *B60W 60/001* (2020.02); *G01C 21/3815* (2020.08); *G01C 21/387* (2020.08); *B60W 2050/0215* (2013.01); *B60W 2556/10* (2020.02); *B60W 2556/40* (2020.02)

(58) Field of Classification Search
CPC ............ G01C 21/3837; G01C 21/3815; G01C 21/387; B60W 50/0205; B60W 60/001; B60W 2050/0215; B60W 2556/10; B60W 2556/40

See application file for complete search history.

(56) References Cited

U.S. PATENT DOCUMENTS 9,523,984 B1 *  12/2016  Herbach ............... B60W 10/18
10,584,971 B1 *  3/2020  Askeland ........... G01C 21/3859
2004/0267441 A1 *  12/2004  Kim ..................... G01C 21/387
                                                         701/410

(Continued)

OTHER PUBLICATIONS

Zheng, L. et al., Lane-Level Road Network Generation Techniques for Lane-Level Maps of Autonomous Vehicles: A Survey, Sustainability, 11: 4511, Jul. 9, 2019.

(Continued)

*Primary Examiner* — Joan T Goodbody
*Assistant Examiner* — Godfrey Aleksander Maciorowski
(74) *Attorney, Agent, or Firm* — Fox Rothschild LLP

(57) ABSTRACT

Disclosed herein are systems, methods, and computer program products for generating and using map information. For example, the method includes: identifying data collection mission area(s) (DCMAs) within a geographic location that is to be covered by robotic device(s) during a data collection mission (DCM); generating a route to be traversed by robotic device(s) in DCMAs (the route being configured to cause robotic device(s) to traverse each two-way road at least one time in two opposing directions); causing robotic device(s) to perform DCM by following the route and collecting data; causing robotic device(s) to discontinue collecting data in response to a trigger event; and using the data collected during DCM to generate or update the map information. The map information may be used to facilitate controlled movement of a vehicle.

23 Claims, 6 Drawing Sheets

(56) References Cited

U.S. PATENT DOCUMENTS

| | | | | |
|---|---|---|---|---|
| 2007/0156286 | A1* | 7/2007 | Yamauchi | G05D 1/027 |
| | | | | 700/245 |
| 2007/0282524 | A1* | 12/2007 | Tanizaki | G09B 29/10 |
| | | | | 340/995.12 |
| 2009/0140887 | A1 | 6/2009 | Breed et al. | |
| 2012/0197839 | A1* | 8/2012 | Vervaet | G09B 29/003 |
| | | | | 707/E17.005 |
| 2017/0110014 | A1* | 4/2017 | Teng | B64U 10/14 |
| 2017/0339820 | A1 | 11/2017 | Foster et al. | |
| 2018/0200888 | A1* | 7/2018 | Kim | G05D 1/0246 |
| 2018/0328745 | A1* | 11/2018 | Nagy | G05D 1/0219 |
| 2019/0063929 | A1* | 2/2019 | Ohyama | G01C 21/3819 |
| 2019/0147331 | A1 | 5/2019 | Arditi | |
| 2019/0170521 | A1* | 6/2019 | Elhoushi | G01C 21/20 |
| 2019/0234755 | A1* | 8/2019 | Zhang | G01C 21/3664 |
| 2019/0271550 | A1 | 9/2019 | Breed et al. | |
| 2019/0339709 | A1* | 11/2019 | Tay | G06F 16/23 |
| 2019/0385360 | A1* | 12/2019 | Yang | G01C 21/3837 |
| 2022/0042821 | A1* | 2/2022 | Patterson | G01C 21/3841 |
| 2022/0126832 | A1* | 4/2022 | Ewert | B60W 10/24 |
| 2022/0412768 | A1* | 12/2022 | Sharifi | G01C 21/367 |

OTHER PUBLICATIONS

Juang, J. et al., Automatic Generation of Road Maps from Low Quality GPS Trajectory Data via Structure Learning, IEEE Access, vol. 6, p. 71965-75,—Oct. 24, 2018.

Jiang, K. et al., A Flexible Multi-Layer Map Model Designed for Lane-Level Route Planning in Autonomous Vehciles, Engineering, 5: 305-18, Nov. 2018.

International Search Report and Written Opinion dated Apr. 27, 2023 for PCT/US2023/014018, 10 pages.

* cited by examiner

SYSTEMS AND METHODS FOR PERFORMING DATA COLLECTION MISSIONS

BACKGROUND

Description of the Related Art

Modern day vehicles have at least one on-board computer and have internet/satellite connectivity. The software running on these on-board computers monitor and/or control operations of the vehicles. The vehicle also comprises monocular or stereo cameras and/or lidar detectors for detecting objects in proximity thereto. The cameras capture images of a scene. The lidar detectors generate lidar datasets that measure the distance from the vehicle to an object at a plurality of different times. These images and distance measurements can be used for detecting and tracking movements of the object, making predictions as to the object's trajectory, and planning paths of travel for the vehicle based on the predicted objects trajectory.

Road maps may also be used to plan paths of travel for the vehicle. The road maps are generated using map data acquired by sensors mounted on vehicles during data collection missions. The vehicles are manually controlled by a driver (who is referred to as a pilot). The vehicle routes are manually determined by another individual (who is referred to as a co-pilot) during the data collection missions. This co-pilot based manual process is expensive and human resource intensive. Also, the vehicle routes are often inefficient in terms of vehicle traversal through certain geographic areas.

This document describes methods and systems that are directed to addressing the problems described above, and/or other issues.

SUMMARY

The present disclosure concerns implementing systems and methods for operating a robotic system. The methods comprise performing the following operations by a computing device: identifying data collection mission area(s) within a geographic location (for example, Miami Fla.) that is to be covered by the robotic(s) device during a data collection mission; generating a route to be traversed by the robotic system(s) in the data collection mission area (where the route is configured to cause the robotic system(s) to traverse each two-way road of a plurality of two-way roads at least one time in two opposing directions); causing the robotic device(s) to perform the data collection mission by following the route and collecting data; causing the robotic device(s) to discontinue collecting data in response to a trigger event; using the data collected during the data collection mission to generate or update the map information; and/or using the map information to facilitate controlled movement of a vehicle (for example, an autonomous vehicle).

In some scenarios, the data collection mission area(s) is(are) identified based on a mile or range setting for data collection mission areas, a total number of data collection mission areas for the geographic location, a location of a terminal or depot where the at least one robotic device resides prior to the data collection mission, priorities of data collection mission areas, road feature priorities, changes to road structures, and/or changes to road features. Additionally or alternatively, the trigger event includes, but is not limited to, a time when traversal of the route by the at least one robotic system is completed, a time when the at least one robotic system has come to a complete stop after traveling a certain distance, reception of a user-software interaction indicating that the data collection mission has been completed, detection of a malfunction or other operational fault of the at least one robotic system, detection of a malfunction or other operational fault of a sensor of the at least one robotic system, and/or expiration of a given period of time In those or other scenarios, the computing device performs operations to: ensure that each collection mission area complies with a rule that states the data collection mission area is not to include an unmapped parking lot, an alley and/or a driveway; ensure that the route complies with rule(s) that states (i) the route is not to include any turns into areas outside of the data collection mission area, (ii) the route is not to include any turns into parking lots, alleys or driveways, (iii) the route is to include a maximized number of right or left turns to create loops, or (iv) the route should cause the robotic device(s) to travel straight through traffic lights when possible; and/or update the route as the robotic device(s) perform(s) the data collection mission based on traversal history of the robotic device(s), location(s) of the robotic device(s), an annotation made to a map during the data collection mission, and/or an inferred existence of route blockage or obstruction. The annotation can include, but is not limited to, a movable graphical object having a style selected from a plurality of styles defined to convey different information.

In those or other scenarios, the methods involve: updating the route in response to an addition of a new annotation to the map or a modification of an existing annotation to the map; displaying information showing parts of the data collection mission area for which data has been collected; causing data collection operation of the robotic device(s) to be suspended or disabled when the robotic device(s) begin(s) to traverse a road an additional time; and/or causing the data collection operations to be unsuspended or re-enabled when the robotic device(s) complete(s) traversal of the road the additional time.

The implementing systems can comprise: a processor; and a non-transitory computer-readable storage medium comprising programming instructions that are configured to cause the processor to implement a method for operating an automated system. The above described methods can also be implemented by a computer program product comprising memory and programming instructions that are configured to cause a processor to perform operations.

BRIEF DESCRIPTION OF THE DRAWINGS

The accompanying drawings are incorporated herein and form a part of the specification.

In the drawings, like reference numbers generally indicate identical or similar elements. Additionally, generally, the

DETAILED DESCRIPTION

Figure 1:
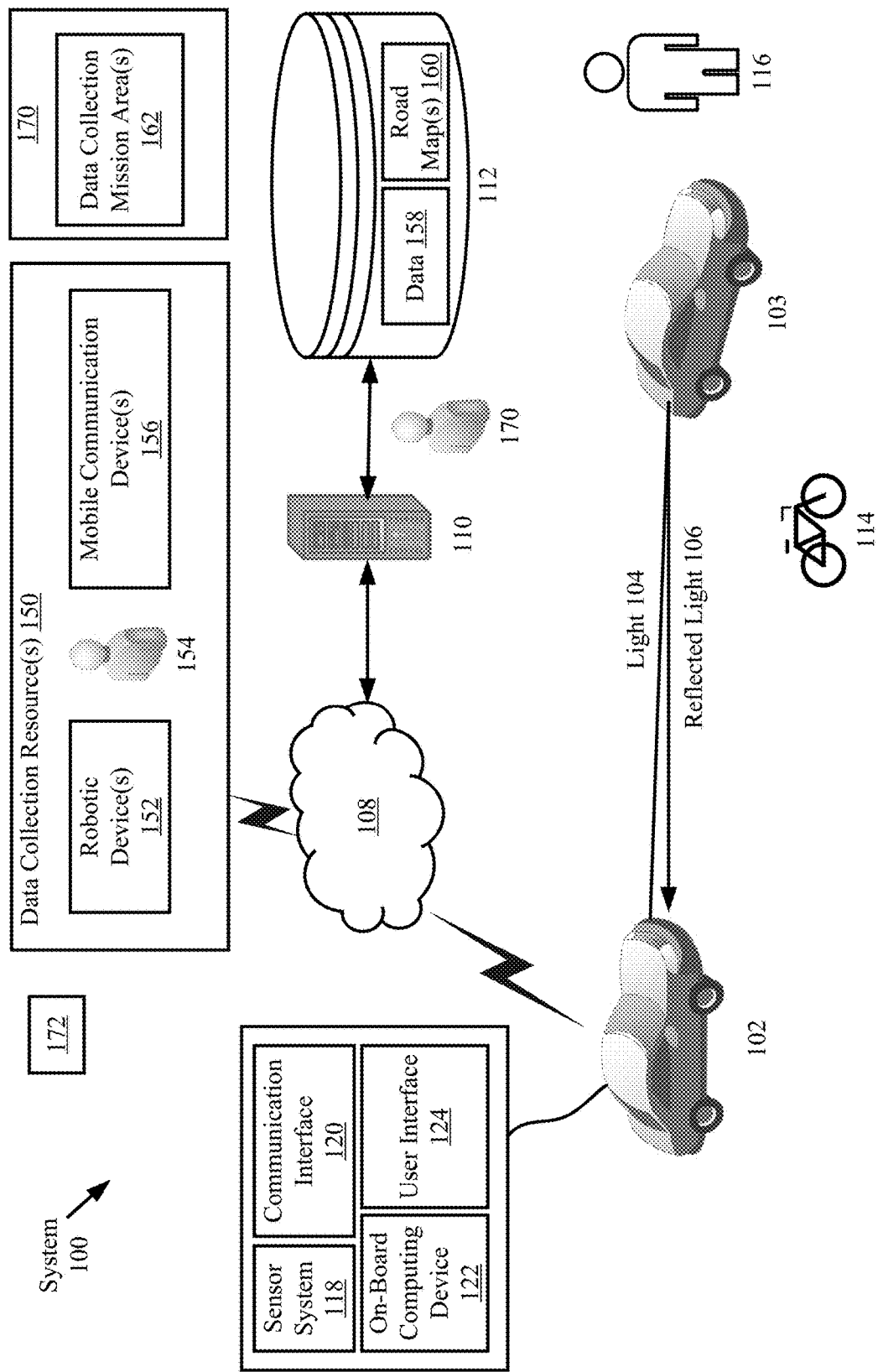
FIG. 1 is an illustration of an illustrative system.

In current autonomous vehicle systems, road maps are used to facilitate path planning and/or driving operations. The road maps are generated using map data that has been manually input into the system and/or acquired by sensors mounted on vehicles during data collection missions. The vehicles are manually controlled by a driver (or pilot) throughout the data collection missions. The vehicle routes are manually determined by another individual (or co-pilot) during the data collection missions. These vehicle routes include vehicle routes from terminals (or depots) to geographic areas for which data is to be collected, vehicle routes through the geographic areas in a manner in which roads are traversed by the vehicle in only one direction, and vehicle routes for returning to the terminals (or depots) upon completion of the data collection missions. This co-pilot based manual routing process is expensive and human resource intensive. Also, the vehicle routes are often inefficient in terms of vehicle traversal through certain geographic areas, and the amount of data collected during the manual driving may be insufficient in some scenarios where accurate and complete high definition maps are required (e.g., autonomous vehicle applications). The present solution addresses these and other issues.

The present solution generally concerns implementing systems and methods for collecting, while a vehicle is traversing roads, data that can be used to generate and/or update a road map. The methods involve: scheduling a data collection mission for a geographic location (for example, Miami, Fla.); and allocating resources for the data collection mission. The resources can include operator(s), vehicle(s), and/or robotic system(s). This scheduling can be performed manually or automatically by a computing device.

Next, a map manager determines, selects or identifies one or more Data Collection Mission Areas (DCMAs) within the geographic location (for example, Miami, Fla.) that are to be covered by the allocated resource(s). The map manager is implemented in hardware and/or software of the computing device or another computing device. This operation can be based on a mile or range setting for DCMAs (for example, 3 miles), a total number of DCMAs for the geographic area, location(s) of terminal(s)/depot(s) where the allocated resource(s) reside, DCMA priorities, road feature priorities (for example, intersection priorities), changes to road structures (for example, a new or additional lane has been added to a road), and/or changes to road features (for example, lights changed or new lights added at intersection(s)). The DCMAs may comply with rules. For example, one rule may be that a DCMA can or cannot include any unmapped parking lots, alleys and/or driveways. The present solution is not limited to the particulars of this example.

A routing algorithm performs operations to generate first route(s) to be traversed by the allocated resource(s) in each DCMA identified by the map manager. The routing algorithm is implemented in hardware and/or software of the computing device or another computing device. Each first route comprises of an efficient route that would allow a resource to (i) traverse two-way roads, lanes or corridors within the DCMA at least one time in each direction and/or (ii) traverse one-way roads, lanes or corridors within the DCMA at least one time in a corresponding direction. Each first route may comply with rules. For example, a rule states that a route is not to include any turns into (i) areas outside of the DCMA, (ii) parking lots, (iii) alleys and/or (iv) driveways. Another rule states that a route is to include a maximized number of right or left turns to create loops that would enhance alignment of sensor data and/or map data. Yet another rule states that a route should cause a vehicle to travel straight through traffic lights when possible. The present solution is not limited to the particulars of these examples.

The routing algorithm also performs operations to generate second route(s) to be traversed by allocated resource(s) from the terminal(s) (or depot(s)) to the DCMA(s). For example, a second route can include a route to be traversed by a vehicle from a given terminal (or depot) to a start location of a given first route through a respective DCMA. The present solution is not limited to the particulars of this example. The second route(s) can be generated using any known or to be known route generation technique.

The resource(s) is(are) then automatically dispatched from the terminal(s) (or depot(s)) to the DCMA(s). Accordingly, the resource(s) follow the second route(s) until reaching starting location(s) for the first route(s). For example, each allocated vehicle performs driving operations to follow a respective second route. Next, the first route(s) is(are) then implemented by the resource(s).

The route manager can dynamically update the first and/or second routes as the resource(s) performs travel operations (for example, as vehicles perform driving operations to follow a given route). The route can be updated or otherwise modified based on the actual traversal history of the vehicle, location of the vehicle, and/or annotations made by the operator to a road map being displayed thereto while performing the data collection mission. The annotations can include movable pins added to the road map. The pins can specify inaccessible roads and other drivable areas that are not to be traversed by the vehicle during the data collection mission. The pins may be styled so that a viewer can easily understand what the pins are intended to convey. The route updating can be performed responsive to the addition of a new pin to the road map or a modification to an existing pin by the operator of the vehicle.

Additionally or alternatively, the annotations may mark a given road as either #could_not_collect (for example, due to construction) or #no_go (for example, undesirable area of operation or area not legal to drive). The route manager will generate an updated route in which the vehicle will avoid traveling through the marked road(s). The route updating can be performed responsive to the addition of a new annotation or a modification to an existing annotation by the operator of the vehicle.

The route manager can also infer that a blockage or other obstruction exists for roads or corridors (e.g., air corridors) that were not traversed by the vehicle. A heuristic algorithm can be used to make such inferences. For example, a heuristic algorithm can make an assumption that a road or corridor is blocked when the vehicle turns a different way at an intersection or other point along a route. The route updating can be made in accordance with this assumption.

The system collects data as the resource(s) traverse(s) the first route(s). The system also tracks whether data has been collected for given parts of each first route, reports the tracked information to remote device(s), and/or displays the tracked information to the operator(s) of vehicle(s) or other robotic system(s). The data collection is discontinued when a vehicle or other robotic system has completed traversal of a first route and/or in response to another trigger event (for example, the operator has performed a user-software interaction for marking the data collection mission as being completed).

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, semi-autonomous vehicles, manually operated vehicles, teleoperated vehicles, watercraft, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Notably, the present solution is being described herein in the context of autonomous vehicles. However, the present solution is not limited to autonomous vehicle applications. The present solution can be used in other applications such as robotic application (for example to control movements of articulating arms) and/or system performance applications.

FIG. 1 illustrates an example system 100, in accordance with aspects of the disclosure. System 100 comprises data collection resource(s) 150 configured to collect data while traversing DCMA(s) 162 in accordance with a novel data collection process. The novel data collection process will be discussed in detail below. The collected data 158 may be stored in a datastore 112 and/or used by computing device(s) 110 to generate and/or update road map(s) 160. The generated and/or updated road map(s) 160 is(are) then used to facilitate motion or movement to of vehicle 102.

The motion or movement may cause vehicle 102 to travel along a road in a semi-autonomous or autonomous manner. Vehicle 102 is also referred to herein as an AV 102. The AV 102 can include, but is not limited to, land vehicles (as shown in FIG. 1), aircraft, watercraft, subterrenes, spacecraft, drones and/or an articulating arm (for example, with a gripper at a free end). As noted above, except where specifically noted this disclosure is not necessarily limited to AV embodiments, and it may include non-autonomous vehicles in some embodiments.

AV 102 is generally configured to detect objects 103, 114, 116 in proximity thereto. The objects can include, but are not limited to, a vehicle 103, a cyclist 114 (such as a rider of a bicycle, electric scooter, motorcycle, or the like) and/or a pedestrian 116.

As illustrated in FIG. 1, the AV 102 may include a sensor system 118, an on-board computing device 122, a communications interface 120, and a user interface 124. AV 102 may further include certain components (as illustrated, for example, in FIG. 2) included in vehicles, which may be controlled by the on-board computing device 122 using a variety of communication signals and/or commands, such as, for example, acceleration signals or commands, deceleration signals or commands, steering signals or commands, braking signals or commands, etc.

Figure 2:
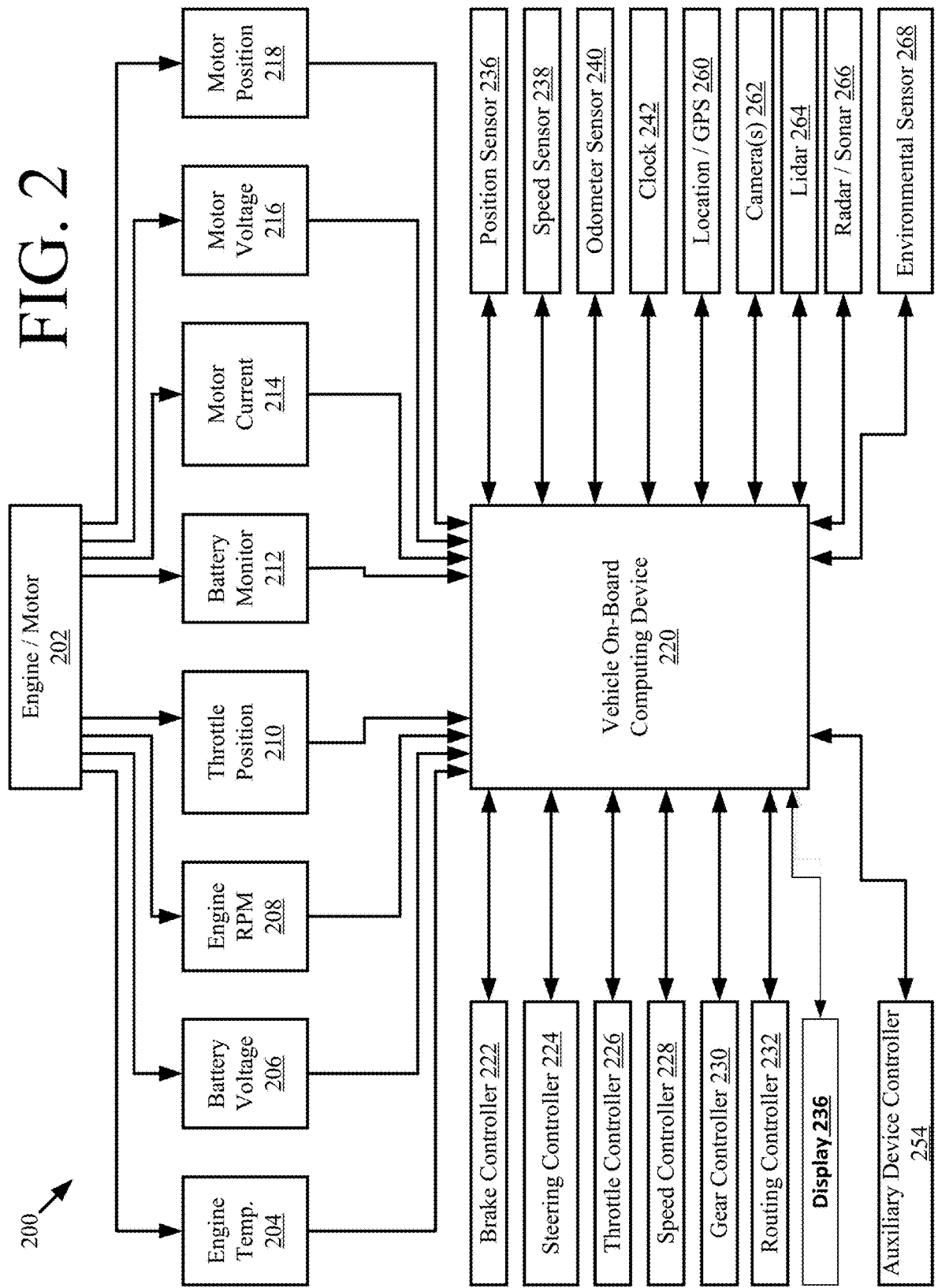
FIG. 2 is an illustration of an illustrative architecture for a vehicle.

The sensor system 118 may include one or more sensors that are coupled to and/or are included within the AV 102, as illustrated in FIG. 2. For example, such sensors may include, without limitation, a lidar system, a RADAR system, a laser detection and ranging (LADAR) system, a sound navigation and ranging (SONAR) system, camera(s) (for example, visible spectrum camera(s), infrared camera(s), etc.), temperature sensors, position sensors (for example, a global positioning system (GPS), etc.), location sensors, fuel sensors, motion sensors (for example, an inertial measurement unit (IMU), etc.), humidity sensors, occupancy sensors, and/or the like. The sensors are generally configured to generate sensor data. The sensor data can include information that describes the location of objects within the surrounding environment of the AV 102, information about the environment itself, information about the motion of the AV 102, information about a route of the vehicle, and/or the like. As AV 102 travels over a surface (for example, a road), at least some of the sensors may collect data pertaining to the surface.

As will be described in greater detail, AV 102 may be configured with a lidar system (for example, lidar system 264 of FIG. 2). The lidar system may be configured to transmit a light pulse 104 to detect objects located within a distance or range of distances of AV 102. Light pulse 104 may be incident on one or more objects (for example, AV 103) and be reflected back to the lidar system. Reflected light pulse 106 incident on the lidar system may be processed to determine a distance of that object to AV 102. The reflected light pulse 106 may be detected using, in some scenarios, a photodetector or array of photodetectors positioned and configured to receive the light reflected back into the lidar system. Lidar information, such as detected object data, is communicated from the lidar system to the on-board computing device 122. The AV 102 may also communicate lidar data to a remote computing device 110 (for example, a cloud processing system) over a network 108. Computing device 110 may be configured with one or more servers to process one or more processes of the technology described herein. Computing device 110 may also be configured to communicate data/instructions to/from AV 102 over network 108, to/from server(s) and/or database(s) 112.

It should be noted that the lidar systems for collecting data pertaining to the surface may be included in systems other than the AV 102 such as, without limitation, other vehicles (autonomous or driven), robots, satellites, etc.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from the database 112. Database 112 may be configured to store and supply raw data, indexed data, structured data, map data, program instructions or other configurations as is known.

The communications interface 120 may be configured to allow communication between AV 102 and external systems, such as, for example, external devices, sensors, other vehicles, servers, data stores, databases, etc. The communications interface 120 may utilize any now or hereafter known protocols, protection schemes, encodings, formats, packaging, etc. such as, without limitation, Wi-Fi, an infrared link, Bluetooth, etc. The user interface 124 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 120 over communication links such as those known as vehicle-to-vehicle, vehicle-to-object or other V2X communication links. The term "V2X" refers to a communication between a vehicle and any object that the vehicle may encounter or affect in its environment.

As noted above, the AV 102 may detect objects 103, 114, 116 in proximity thereto. Such object detections are facilitated using the sensor data generated by the sensor system 118 (for example, lidar datasets generated by an onboard lidar detector). The sensor data is processed by the onboard computing device 122 of the AV 102 and/or by the remote computing device 110 to obtain one or more predicted trajectories for the object given the sensor data. The predicted trajectories for the object may then be used to generate a trajectory for the AV 102. The AV 103 may then be caused by the on-board computing device to follow the trajectory.

FIG. 2 illustrates a system architecture 200 for a vehicle, in accordance with aspects of the disclosure. Vehicles 102 and/or 103 of FIG. 1 can have the same or similar system architecture as that shown in FIG. 2. Thus, the following discussion of system architecture 200 is sufficient for understanding vehicle(s) 102, 103 of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, the system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors 218 such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device 220, it may be a separate device, or multiple clocks may be available.

The vehicle also will include various sensors that operate to gather information about the environment in which the vehicle is traveling. These sensors may include, for example: a location sensor 260 (for example, a GPS device); object detection sensors such as one or more cameras 262; a lidar sensor system 264; and/or a RADAR and/or SONAR system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The vehicle on-board computing device 220 may be implemented using the computer system of FIG. 4. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the vehicle on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors to the vehicle on-board computing device 220. The object detection information and/or captured images are processed by the vehicle on-board computing device 220 to detect objects in proximity to the vehicle. Any known or to be known technique for making an object detection based on sensor data and/or captured images can be used in the embodiments disclosed in this document.

Lidar information is communicated from lidar system 264 to the vehicle on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle. The manner in which the object detections are made by the vehicle on-board computing device 220 includes such capabilities detailed in this disclosure.

In addition, the system architecture 200 may include an onboard display device 236 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 220 may include and/or may be in communication with a routing controller 232 that generates a navigation route from a start position to a destination position for an autonomous vehicle. The routing controller 232 may access a map data store to identify possible routes and road segments that a vehicle can travel on to get from the start position to the destination position. The routing controller 232 may score the possible routes and identify a preferred route to reach the destination. For example, the routing controller 232 may generate a navigation route that minimizes Euclidean distance traveled or other cost function during the route, and may further access the traffic information and/or estimates that can affect an amount of time it will take to travel on a particular route. Depending on implementation, the routing controller 232 may generate one or more routes using various routing methods, such as Dijkstra's algorithm, Bellman-Ford algorithm, or other algorithms. The routing controller 232 may also use the traffic information to generate a navigation route that reflects expected conditions of the route (for example, current day of the week or current time of day, etc.), such that a route generated for travel during rush-hour may differ from a route generated for travel late at night. The routing controller 232 may also generate more than one navigation route to a destination and send more than one of these navigation routes to a user for selection by the user from among various possible routes.

In some scenarios, the vehicle on-board computing device 220 may determine perception information of the surrounding environment of the vehicle. Based on the sensor data provided by one or more sensors and location information that is obtained, the vehicle on-board computing device 220 may determine perception information of the surrounding environment of the vehicle. The perception information may represent what an ordinary driver would perceive in the surrounding environment of a vehicle. The perception data may include information relating to one or more objects in the environment of the vehicle. For example, the vehicle on-board computing device 220 may process sensor data (for example, lidar data, RADAR data, camera images, etc.) in order to identify objects and/or features in the environment of vehicle. The objects may include, but is not limited to, traffic signals, roadway boundaries, other vehicles, pedestrians, and/or obstacles. The vehicle on-board computing device 220 may use any now or hereafter known object recognition algorithms, video tracking algorithms, and computer vision algorithms (for example, track objects frame-to-frame iteratively over a number of time periods) to determine the perception.

In those or other scenarios, the vehicle on-board computing device 220 may also determine, for one or more identified objects in the environment, the current state of the object. The state information may include, without limitation, for each object: a current location; a current speed; an acceleration; a current heading; a current pose; a current shape, size and/or footprint; an object type or classification (for example, vehicle. pedestrian, bicycle, static object, or obstacle); and/or other state information.

The vehicle on-board computing device 220 may perform one or more prediction and/or forecasting operations. For example, the vehicle on-board computing device 220 may predict future locations, trajectories, and/or actions of one or more objects. For example, the vehicle on-board computing device 220 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the vehicle on-board computing device 220 may predict whether the object will likely move straight forward or make a turn. If the perception data indicates that the intersection has no traffic light, the vehicle on-board computing device 220 may also predict whether the vehicle may have to fully stop prior to entering the intersection.

In those or other scenarios, the vehicle on-board computing device 220 may determine a motion plan for the vehicle. For example, the vehicle on-board computing device 220 may determine a motion plan for the vehicle based on the perception data and/or the prediction data. Specifically, given predictions about the future locations of proximate objects and other perception data, the vehicle on-board computing device 220 can determine a motion plan for the vehicle that best navigates the vehicle relative to the objects at their future locations.

In those or other scenarios, the vehicle on-board computing device 220 may receive predictions and make a decision regarding how to handle objects and/or actors in the environment of the vehicle. For example, for a particular actor (for example, a vehicle with a given speed, direction, turning angle, etc.), the vehicle on-board computing device 220 decides whether to overtake, yield, stop, and/or pass based on, for example, traffic conditions, map data, state of the autonomous vehicle, etc. Furthermore, the vehicle on-board computing device 220 also plans a path for the vehicle to travel on a given route, as well as driving parameters (for example, distance, speed, and/or turning angle). That is, for a given object, the vehicle on-board computing device 220 decides what to do with the object and determines how to do it. For example, for a given object, the vehicle on-board computing device 220 may decide to pass the object and may determine whether to pass on the left side or right side of the object (including motion parameters such as speed). The vehicle on-board computing device 220 may also assess the risk of a collision between a detected object and the vehicle. If the risk exceeds an acceptable threshold, it may determine whether the collision can be avoided if the vehicle follows a defined vehicle trajectory and/or implements one or more dynamically generated emergency maneuvers in a time period (for example, N milliseconds). If the collision can be avoided, then the vehicle on-board computing device 220 may execute one or more control instructions to perform a cautious maneuver (for example, mildly slow down, accelerate, change lane, or swerve). In contrast, if the collision cannot be avoided, then the vehicle on-board computing device 220 may execute one or more control instructions for execution of an emergency maneuver (for example, brake and/or change direction of travel).

As discussed above, planning and control data regarding the movement of the vehicle is generated for execution. The vehicle on-board computing device 220 may, for example: control braking via a brake controller; direction via a steering controller; speed and acceleration via a throttle controller (in a gas-powered vehicle) or a motor speed controller (such as a current level controller in an electric vehicle); change gears via a differential gear controller (in vehicles with transmissions); and/or control other operations via other controllers.

Figure 3:
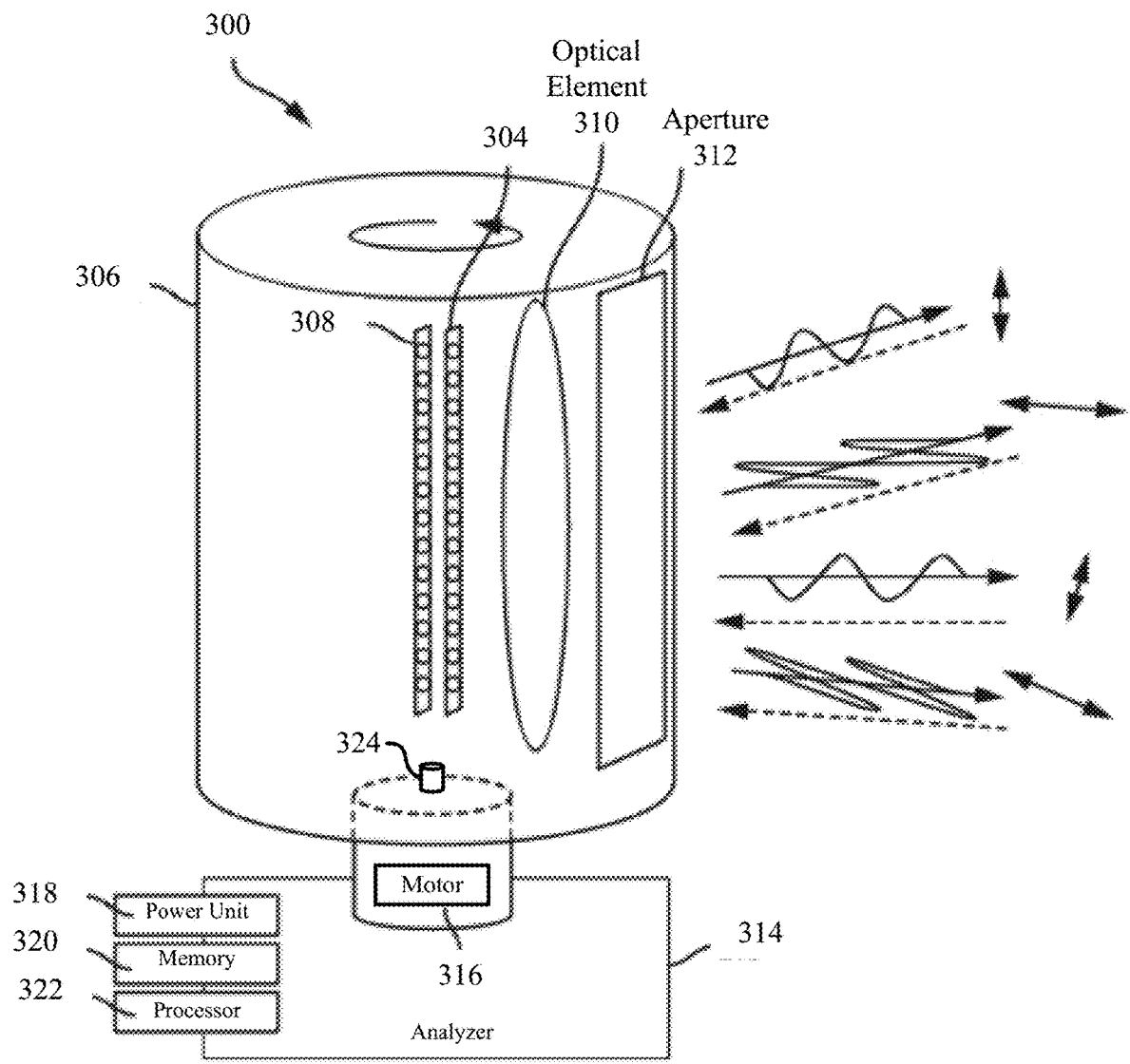
FIG. 3 is an illustration of an illustrative architecture for a light detection and ranging (lidar) system employed by the vehicle shown in FIG. 2.

FIG. 3 illustrates an architecture for a lidar system 300, in accordance with aspects of the disclosure. Lidar system 264 of FIG. 2 may be the same as or substantially similar to the lidar system 300. As such, the discussion of lidar system 300 is sufficient for understanding lidar system 264 of FIG. 2. It should be noted that the lidar system 300 of FIG. 3 is merely an example lidar system and that other lidar systems are further completed in accordance with aspects of the present disclosure, as should be understood by those of ordinary skill in the art.

As shown in FIG. 3, the lidar system 300 includes a housing 306 which may be rotatable 360° about a central axis such as hub or axle 324 of a motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 312 as the housing 306 rotates around the internal components. In alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (for example, 8 emitters, 64 emitters, or 128 emitters). The emitters may emit light of substantially the same intensity or of varying intensities. The lidar system will also include a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitting unit 304 and/or the light detector 308 to serve as one or more lenses or wave plates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

The lidar system 300 will include a power unit 318 to power the light emitting unit 304, motor 316, and electronic components. The lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

Figure 4:
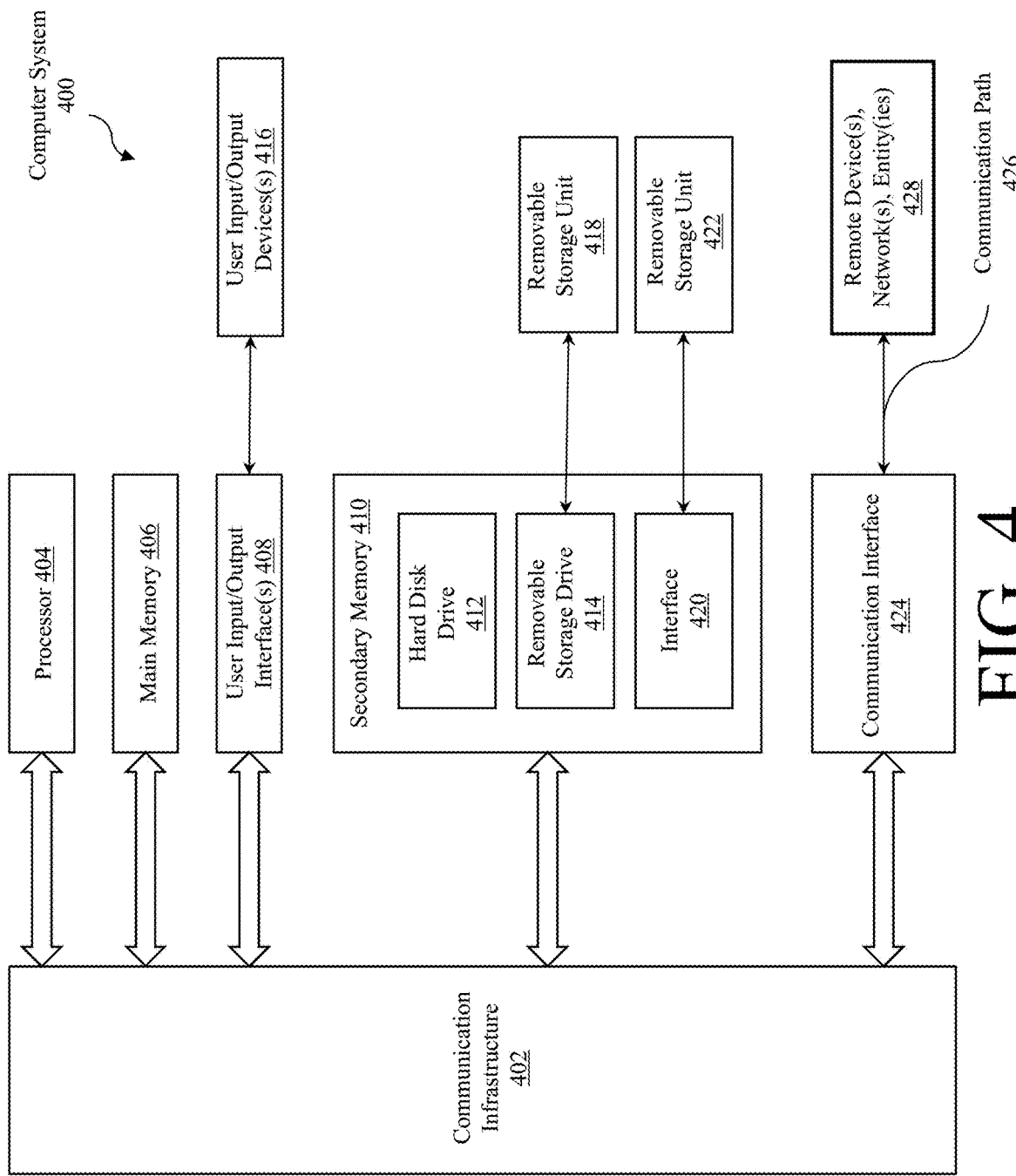
FIG. 4 is an illustration of an illustrative computing device.

The present solution can be implemented, for example, using one or more computer systems, such as computer system 400 shown in FIG. 4. Computer system 400 can be any computer capable of performing the functions described herein. The on-board computing device 122 of FIG. 1, computing device 110 of FIG. 1, robotic device(s) 152 of FIG. 1, mobile communication device(s) 156 of FIG. 1, and/or the vehicle on-board computing device 220 of FIG. 2 may be the same as or similar to computing system 400. As such, the discussion of computing system 400 is sufficient for understanding the devices 110, 122, 152, 156 220 of FIGS. 1-2.

Computing system 400 may include more or less components than those shown in FIG. 4. However, the components shown are sufficient to disclose an illustrative solution implementing the present solution. The hardware architecture of FIG. 4 represents one implementation of a representative computing system configured to operate a vehicle, as described herein. As such, the computing system 400 of FIG. 4 implements at least a portion of the method(s) described herein.

Some or all components of the computing system 400 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

Computer system 400 includes one or more processors (also called central processing units, or CPUs), such as a processor 404. Processor 404 is connected to a communication infrastructure or bus 402. One or more processors 404 may each be a graphics processing unit (GPU). In some scenarios, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 416, such as monitors, keyboards, pointing devices, etc., that communicate with communication infrastructure 402 through user input/output interface(s) 408. Computer system 400 further includes a main or primary memory 406, such as random access memory (RAM). Main memory 406 may include one or more levels of cache. Main memory 406 has stored therein control logic (i.e., computer software) and/or data.

One or more secondary storage devices or memories 410 may be provided with computer system 400. Secondary memory 410 may include, for example, a hard disk drive 412 and/or a removable storage device or drive 414. Removable storage drive 414 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be an external hard drive, a universal serial bus (USB) drive, a memory card such as a compact flash card or secure digital memory, a floppy disk, a magnetic tape, a compact disc, a DVD, an optical storage disk, and/or any other computer data storage device. Removable storage drive 414 reads from and/or writes to removable storage unit 414 in a well-known manner.

In some scenarios, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In some scenarios, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 406, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use the present solution using data processing devices, computer systems and/or computer architectures other than that shown in FIG. 4. In particular, the present solution can operate with software, hardware, and/or operating system implementations other than those described herein.

Figure 5:
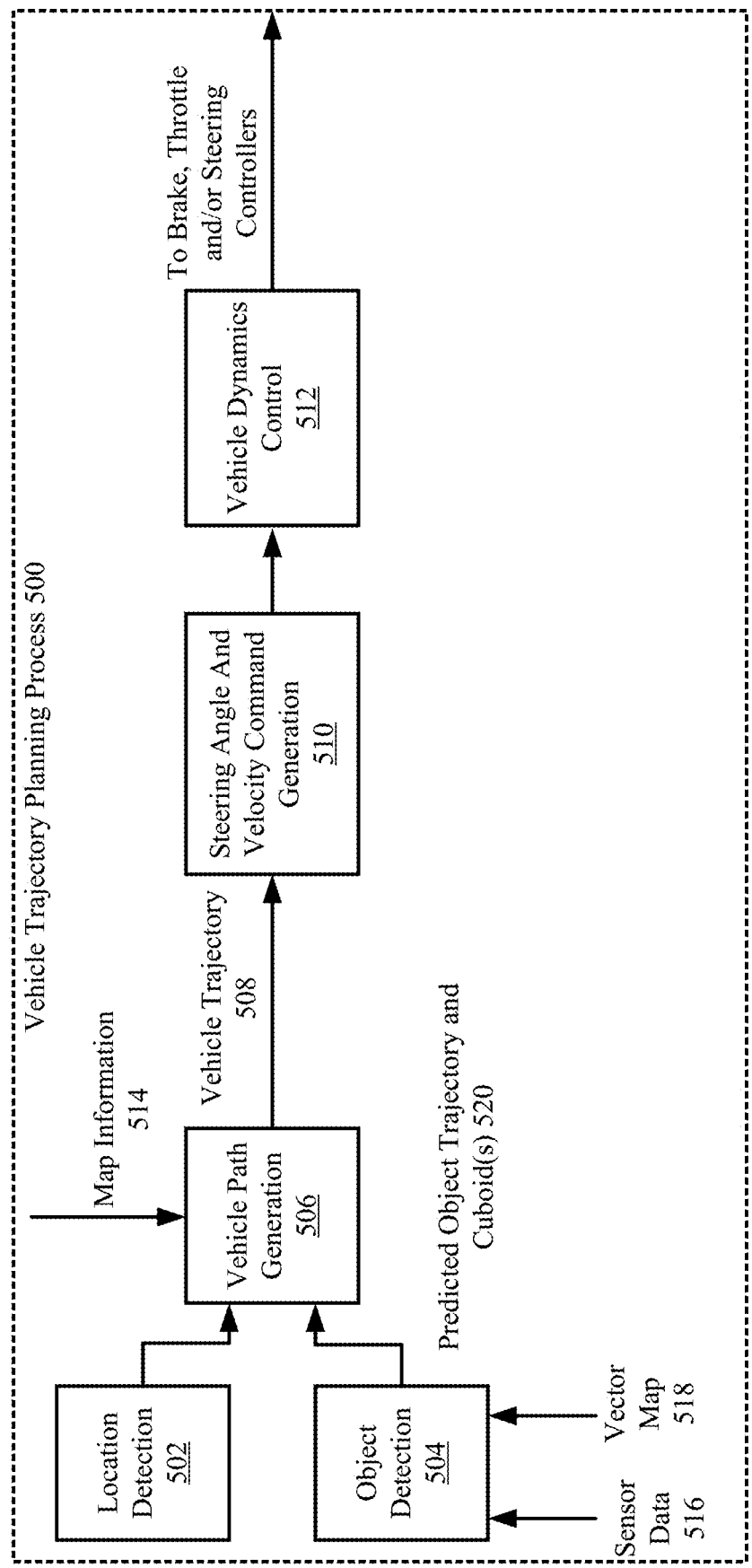
FIG. 5 provides a block diagram of an illustrative vehicle trajectory planning process.

FIG. 5 provides a block diagram that is useful for understanding how motion or movement of an AV is achieved in accordance with the present solution. All of the operations performed in blocks 502-512 can be performed by the on-board computing device (for example, on-board computing device 122 of FIG. 1 and/or 220 of FIG. 1) of a vehicle (for example, AV 102 of FIG. 1).

In block 502, a location of the AV (for example, AV $102_1$ of FIG. 1) is detected. This detection can be made based on sensor data output from a location sensor (for example, location sensor 260 of FIG. 2) of the AV. This sensor data can include, but is not limited to, GPS data. The detected location of the AV is then passed to block 506.

In block 504, an object (for example, vehicle 103 of FIG. 1) is detected within proximity of the AV (for example, <100+meters). This detection is made based on sensor data output from a camera (for example, camera 262 of FIG. 2) of the AV and/or a lidar system (for example, lidar system 264 of FIG. 2) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 504 for the object. The object's trajectory is predicted in block 504 based on the object's class, cuboid geometry(ies), cuboid heading(s) and/or contents of a map 518 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 518 (for example, lane geometries). Techniques for predicting object trajectories based on cuboid geometries and headings are well known in the art. One technique involves predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 520 specifying the object's predicted trajectory, the cuboid geometry(ies)/heading(s) is provided to block 506. In some scenarios, a classification of the object is also passed to block 506. In block 506, a vehicle trajectory is generated using the information from blocks 502 and 504. Techniques for determining a vehicle trajectory using a cuboids are well known in the art. For example, in some scenarios, such a technique involves determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 520 can be determined based on the location information from block 502, the object detection information from block 504, and/or map information 514 (which is pre-stored in a data store of the vehicle). The map information 514 may include, but is not limited to, all or a portion of road map(s) 160 of FIG. 1. The vehicle trajectory 520 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 520 is then provided to block 508.

In block 508, a steering angle and velocity command is generated based on the vehicle trajectory 520. The steering angle and velocity command are provided to block 510 for vehicle dynamics control, i.e., the steering angle and velocity command causes the AV to follow the vehicle trajectory 508.

Figure 6:
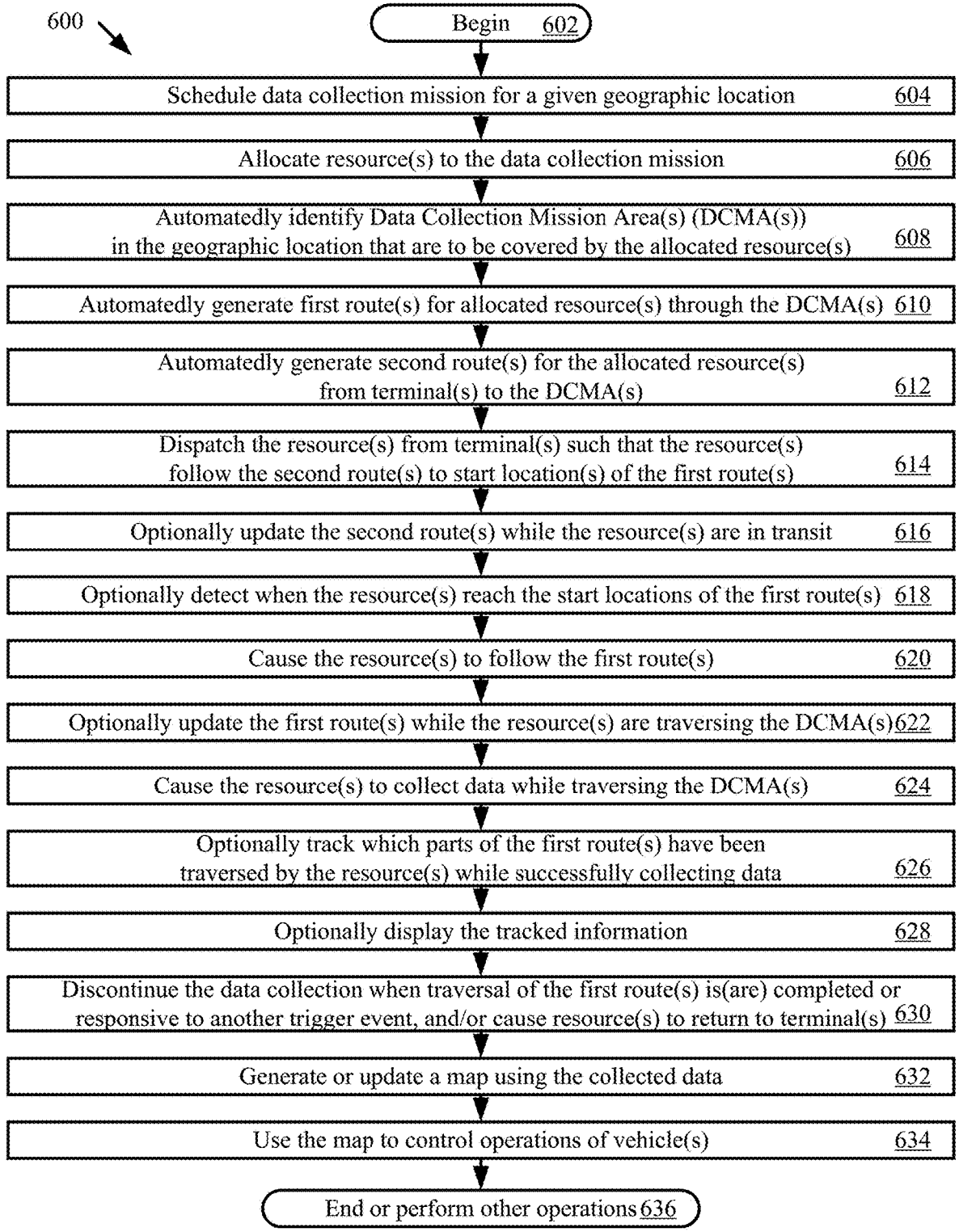
FIG. 6 provides a flow diagram of an illustrative method for generating map information and/or using the same to operate vehicle(s) and/or other robotic device(s).

FIG. 6 provides a flow diagram of an illustrative method 600 for generating map information (for example, map information 514 of FIG. 5) and/or using the same to operate a vehicle (for example, vehicle 102 of FIG. 1). Method 600 begins with 602 and continues with 604 where a data collection mission is scheduled for a geographic location (for example, geographic area 170 of FIG. 1). The geographic location can include, but is not limited to, street(s), road(s), city block(s), city(ies), county(ies), state(s) and/or country(ies). The data collection mission may be scheduled (i) manually by an individual (for example, individual 170 of FIG. 1) via user-software interactions using a computing device (for example, computing device 110 of FIG. 1) and/or (ii) automatically by the computing device in accordance with predefined rules that consider criteria. The criteria can include, but is not limited to, a time of day, a time of year, data accuracy confidence score(s) for portion(s) of a given road map, amount(s) of unknown information for portion(s) of a given road map, type(s) of change(s) to road feature(s) and/or structure(s), extent or degree of change(s) to road feature(s) and/or structure(s), and/or known location(s) of construction that may have an impact on a vehicle's ability to traverse lane(s), street(s) and/or road(s). For example, a rule may be that a data collection mission for a given city is to be performed during weekday nighttime hours in a month with relatively low traffic history (for example, June). The rule may be selectively applied when (i) there has been a change to road feature(s)/structure(s) of particular type(s) and/or (ii) a given road map needs to be generated for the city or updated to improve the accuracy and/or level of detail for corresponding portion(s) of the map. The present solution is not limited to the particulars of this example.

Resource(s) is(are) allocated to the data collection mission in 606. The resource(s) can include, but is(are) not limited to, robotic device(s) (for example, robotic device(s) 152 of FIG. 1), individual(s) (for example, individual(s) 154 of FIG. 1) and/or mobile communication device(s) (for example, mobile communication device(s) 156 of FIG. 1). The robotic device(s) may comprise, in some scenarios, vehicle(s) that is(are) the same as or similar to vehicle 102 of FIG. 1. The individual(s) 154 may comprise occupant(s) of the robotic device(s) and/or operator(s) of the robotic device(s). The mobile communication device(s) can include, but is(are) not limited to, portable computer(s) and/or smart device(s) (for example, smart phone(s) and/or watch(es)).

In 608, the computing device performs operations to automatedly identify one or more DCMAs (for example, DCMA(s) 162 of FIG. 1) within the geographic area that are to be covered by the allocated resource(s). Each DCMA may comprise the entire geographic area for which the data collection mission was scheduled or a portion of the geographic area for which the data collection mission was scheduled.

Any number of DCMAs can be identified in accordance with a given application. For example, the DCMA(s) can be identified based on a mile or range setting for DCMAs (for example, 3 miles), a total number of DCMAs for the geographic area, location(s) of terminal(s)/depot(s) where the allocated resource(s) reside, DCMA priorities, road feature priorities (for example, intersection priorities), changes to road structures (for example, a new or additional lane has been added to a road), changes to road features (for example, lights changed or new lights added at intersection(s)), length of time and/or mission breaks. For example, the geographic area includes Miami Fla. which is 55.25 mi$^2$ and a mile/range setting for DCMAs is 5 mi$^2$. Thus, eleven DCMAs are identified by the computing device. The DCMAs are prioritized in accordance with DCMA priorities, road feature priorities, and/or a total number of road structures/features thereof that have been changed. Additionally or alternatively, if vehicle availability exists for a certain amount of time, then the DCMAs are selected which could be completed or otherwise performed within this amount of time. The DCMAs can further be selected based on how many mission breaks of a threshold duration can occur during a respective mission. The present solution is not limited to the particulars of this example.

The DCMAs may comply with rules. For example, one rule may be that a DCMA can or cannot include any unmapped parking lots, alleys and/or driveways. Other rules may be that the DCMAs fall within overall size limits, cannot include roads with speed limits exceeding threshold values, and/or cannot include unsupported road features (e.g., tunnels or bidirectional roads). The present solution is not limited to the particulars of this example.

In 610, the computing device performs operations to generate first route(s) to be traversed by the allocated resource(s) in each DCMA. Each first route comprises an efficient route that would allow a resource (e.g., robotic device 152 of FIG. 1) to (i) traverse two-way roads, lanes or corridors within the DCMA at least one time in each direction and/or (ii) traverse one-way roads, lanes or corridors within the DCMA at least one time in a corresponding direction. Each first route may comply with rule(s). For example, a rule states that a route is not to include any turns into (i) areas outside of the DCMA, (ii) parking lots, (iii) alleys and/or (iv) driveways. Another rule states that a route is to include a maximized number of right or left turns to create loops that would enhance alignment of sensor data and/or map data. Yet another rule states that a route should cause a vehicle to travel straight through traffic lights when possible. Another rule may state that right turns should be performed first and left turns should be performed second or otherwise at the end of a mission. The present solution is not limited to the particulars of these examples.

In 612, the computing device performs operations to generate second route(s) to be traversed by allocated resource(s) from terminal(s) (or depot(s)) (for example, terminal(s) 172 of FIG. 1) to the DCMA(s). For example, a second route can include a route to be traversed by a resource from a given terminal (or depot) to a start location of a given first route through a respective DCMA. The present solution is not limited to the particulars of this example. The second route(s) can be generated using any known or to be known route generation technique between a starting place/location and a destination place/location.

Upon completing 612, the resource(s) is(are) then automatedly dispatched by the computing device from the terminal(s) (or depot(s)) to the DCMA(s). Once dispatched, the resource(s) follow the second route(s) until reaching starting location(s) for the first route(s). For example, each allocated vehicle may perform autonomous driving operations to follow a respective second route. Alternatively, a pilot manually drives or remotely controls driving operations of each vehicle until it reaches the DCMA. In this case, turn-by-turn directions can be output from output devices of the vehicle, a mobile communication device (for example, mobile communication device 156 of FIG. 1), and/or a computing device (for example, computing device 110 of FIG. 1). The output devices can include, but are not limited to, display screen(s), speaker(s) and/or vibration device(s). The present solution is not limited to the particulars of these examples. It should be noted that since the second routes are automatedly generated a co-pilot is not needed prior to the start of the data collection mission. Consequently, the present solution is less costly and human resource intensive as compared to conventional solutions.

The second route(s) can optionally be updated in 614 by the computing device or another computing device (for example, an onboard computing device of a vehicle) while the resource(s) are in transit to the DCMAs. A second route can be updated or otherwise modified based on the actual traversal history of the resource, location of the resource, and/or annotations made by an occupant of the robotic system or other individual (for example, a remotely located pilot of a teleoperated robotic system) to a map being displayed thereto while the robotic system is in transit from a terminal to a DCMA. The map can be displayed on a display device of the robotic system, a display device of a mobile communication device in the occupant's possession, and/or a display device of a remote computing device (for example, computing device 110 of FIG. 1).

In 618, the system optionally detects when the resource(s) reach the start location(s) of the first route(s). Various types of location data can be used to make this detection, such as GPS data and/or triangulation data. The resource(s) is(are) then caused to follow the first route(s) through the DCMA(s), as shown by 620. For example, each allocated vehicle may perform autonomous driving operations to follow a respective first route. Alternatively, a pilot manually drives or remotely controls driving operations of each vehicle through the DCMA. In this case, turn-by-turn directions can be output from output devices of the vehicle, a mobile communication device (for example, mobile communication device 156 of FIG. 1), and/or a computing device (for example, computing device 110 of FIG. 1). The output devices can include, but are not limited to, display screen(s), speaker(s) and/or vibration device(s). The present solution is not limited to the particulars of these examples. It should be noted that since the first routes are automatically generated a co-pilot is not needed during the data collection mission. Consequently, the present solution is less costly and human resource intensive as compared to conventional solutions.

The first route(s) may optionally be updated in 622 by the computing device or another computing device (for example, an onboard computing device of a vehicle) as the resource(s) perform(s) travel operations associated with the data collection mission (for example, as vehicles perform driving operations to follow a given first route). A first route can be updated or otherwise modified based on the actual traversal history of the robotic system, location of the robotic system, and/or annotations made by an occupant to a map being displayed thereto while performing the data collection mission. The map can be displayed on a display device of the robotic system, a display device of a mobile communication device in the occupant's possession, and/or a display device of a remote computing device (for example, computing device 110 of FIG. 1).

The annotations can include movable graphical objects (for example, pins) added to the map via user-software interactions and/or verbal commands. The graphical objects can specify inaccessible roads and other travelable areas (for example, drivable areas) that are not to be traversed by the robotic system during the data collection mission. The graphical objects may be styled so that a viewer can easily understand what the graphical objects are intended to convey. For example, a green pin or a first icon is intended to convey a road that is now accessible, a yellow pin or a second different icon is intended to convey an intersection in which a traffic light is not functioning properly, and a red pin or a third different icon is intended to convey that an entrance to an underpass is blocked due to construction. The present solution is not limited to the particulars of this example.

The first route updating can be performed responsive to the addition of a new graphical objects to the map and/or a modification to an existing graphical objects by an occupant of the robotic system or other individual (for example, a remotely located pilot of a teleoperated robotic system). An existing graphical object may also be manually modified and/or dynamically modified by the computing device based on contents of sensor data generated during the data collection mission. For example, a displayed map has a graphical object therein or superimposed thereover. The computing device determines that the current style and/or location of the graphical object does not accurately or properly convey what is specified by the sensor data. Accordingly, the computing device performs operations to automatically change the style and/or location of the graphical object in accordance with that specified by the sensor data. The individual can be notified of the automatic change to the graphical object and prompted to accept or reject the same. The present solution is not limited to the particulars of this example.

Additionally or alternatively, the annotations may mark a given road as either #could_not_collect (for example, due to construction) or #no_go (for example, undesirable area of operation or area not legal to traverse). The computing device may generate an updated route in which the robotic system will avoid traveling through the marked road(s). The route updating can be performed responsive to the addition of a new graphical object to the map and/or a modification to an existing graphical object by an occupant of the robotic system or other individual (for example, a remotely located pilot of a teleoperated robotic system).

Since the annotations can affect routing, placement thereof should be accurate. For instance, if a road is blocked off (for example, due to the presence of a private road, construction or inaccuracy of map representation), then the occupant should add an annotation to the map that the road is inaccessible or data could not be collected for the same. The system then takes this into account when modifying the first route so that the vehicle is not routed through this road. The present solution is not limited to the particulars of this example.

The computing device can also perform operations to infer that a blockage or other obstruction exists for lanes or roads that were not traversed by the robotic system. A heuristic algorithm can be used to make such inferences. For example, a heuristic algorithm can infer or assume that a road is blocked when a vehicle turns a different way than expected (in view of first route) at an intersection. The route updating can be made in accordance with this assumption. The present solution is not limited to the particulars of this example.

In 624, the resource(s) is(are) caused to collect data while traversing the DCMAs. For example, the robotic system(s) include a plurality of sensor(s) that continuously or periodically generate sensor data as the resource(s) follow(s) the first route(s). The sensor(s) can include, but are not limited to, location/GPS device(s), camera(s), radar/sonar device(s), environmental sensor(s), lidar device(s) and/or other sensor(s). The data collection by the robotic system(s) can be automatically started when the robotic systems enter the DCMAs. An occupant(s) of the robotic system(s) may be notified when the data collection begins. This notification can be auditory, visual and/or tactile. The notification can be provide via output devices of the robotic system(s), mobile communication device(s) and/or computing device(s). The occupant(s) (for example, individual 154 of FIG. 1) may additionally manually input information into the system during the data collection mission. For example, the occupant may add annotations to a displayed map as described above. The present solution is not limited to the particulars of this example.

In some scenarios, the vehicle(s) may traverse the same road three or more times (for example, such as when a detour exists). As noted above, the first route causes the vehicle to traverse a given road in both directions while data is being collected. The vehicle may be configured such that (i) the data collection operations thereof are temporarily suspended or disabled when the vehicle begins to traverse the given road an additional time (for example, a second time for a one-way road or a third time for a two-way road) and (ii) the data collection operations thereof are unsuspended or re-enabled when the vehicle completes traversal of the given road the additional time. This feature of the present solution reduces the amount of repetitive data collection during the data collection mission.

The collected data can optionally be used in 626 by the computing device(s) to track which parts of the first route(s) have been traversed by the resource(s) while successfully collecting data. The tracked information may be displayed on display device(s) of the robotic system(s), display device(s) of mobile communication device in occupant possession, and/or a display device of a remote computing device (for example, computing device 110 of FIG. 1). The tracked information may also be stored in a remote datastore (for example, datastore 112 of FIG. 1) and/or a local datastore (for example, memory 406, 410 of FIG. 4) of the robotic system(s), mobile communication device(s), remote computing device(s).

The data collection is discontinued in 630 in response to a trigger event. The trigger event can include, but is not limited to, a time when traversal of the first route(s) by the resource(s) is(are) completed, a time when the robotic system has come to a complete stop after traveling a certain distance, reception of a user-software interaction indicating that the data collection mission has been completed, detection of a malfunction or other operational fault of the robotic system(s), detection of a malfunction or other operational fault of sensor(s) of the robotic system(s), and/or expiration of a given period of time. An occupant(s) of the robotic system(s) may be notified when the data collection is discontinued or other stops. This notification can be auditory, visual and/or tactile. The notification can be provided via output devices of the robotic system(s), mobile communication device(s) and/or computing device(s).

630 can also involve causing the resource(s) to return to the terminal(s) (or depot(s)). The system can automatedly generate third route(s) for the resource(s) in the same or similar manner as the second route(s).

In 632, the collected data is used to generate or update one or more maps. Techniques for generating and updating maps are well known. Any known or to be known technique can be used here. The map is then used in 634 to control operations of vehicle(s) (for example, vehicle 102 of FIG. 1) as described above (for example, in relation to FIG. 5). Subsequently, 636 is performed where method 600 ends or other operations are performed.

As evident from the above discussion, the present disclosure concerns implementing systems and methods for generating and using map information. In some scenarios, the methods comprise performing the certain operations by a computing device. The computing device can be a centralized computing device or a distributed computing device. The operations include: identifying data collection mission area(s) within a geographic location (for example, Miami Florida) that is to be covered by the robotic(s) device during a data collection mission; generating a route to be traversed by the robotic system(s) in the data collection mission area (where the route is configured to cause the robotic system(s) to traverse each two-way road of a plurality of two-way roads at least one time in two opposing directions); causing the robotic device(s) to perform the data collection mission by following the route and collecting data; causing the robotic device(s) to discontinue collecting data in response to a trigger event; using the data collected during the data collection mission to generate or update the map information; and/or using the map information to facilitate controlled movement of a vehicle (for example, an autonomous vehicle).

In some scenarios, the data collection mission area(s) is(are) identified based on a mile or range setting for data collection mission areas, a total number of data collection mission areas for the geographic location, a location of a terminal or depot where the at least one robotic device resides prior to the data collection mission, priorities of data collection mission areas, road feature priorities, changes to road structures, and/or changes to road features. Additionally or alternatively, the trigger event includes, but is not limited to, a time when traversal of the route by the at least one robotic system is completed, a time when the at least one robotic system has come to a complete stop after traveling a certain distance, reception of a user-software interaction indicating that the data collection mission has been completed, detection of a malfunction or other operational fault of the at least one robotic system, detection of a malfunction or other operational fault of a sensor of the at least one robotic system, and/or expiration of a given period of time In those or other scenarios, the computing device performs operations to: ensure that each collection mission area complies with a rule that states the data collection mission area is not to include an unmapped parking lot, an alley and/or a driveway; ensure that the route complies with rule(s) that states (i) the route is not to include any turns into areas outside of the data collection mission area, (ii) the route is not to include any turns into parking lots, alleys or driveways, (iii) the route is to include a maximized number of right or left turns to create loops, or (iv) the route should cause the robotic device(s) to travel straight through traffic lights when possible; and/or update the route as the robotic device(s) perform(s) the data collection mission based on traversal history of the robotic device(s), location(s) of the robotic device(s), an annotation made to a map during the data collection mission, and/or an inferred existence of route blockage or obstruction. The annotation can include, but is not limited to, a movable graphical object having a style selected from a plurality of styles defined to convey different information.

In those or other scenarios, the methods involve: updating the route in response to an addition of a new annotation to the map or a modification of an existing annotation to the map; displaying information showing parts of the data collection mission area for which data has been collected; causing data collection operation of the robotic device(s) to be suspended or disabled when the robotic device(s) begin(s) to traverse a road an additional time; and/or causing the data collection operations to be unsuspended or re-enabled when the robotic device(s) complete(s) traversal of the road the additional time.

The implementing systems can comprise: a processor; and a non-transitory computer-readable storage medium comprising programming instructions that are configured to cause the processor to implement a method for operating an automated system. The above described methods can also be implemented by a computer program product comprising a memory and programming instructions that are configured to cause a processor to perform operations.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A method for generating and using map information, comprising:
   identifying, by the computing device, data collection mission areas within a geographic location that are to be covered by at least one robotic device during a data collection mission;
   prioritizing, by a computing device, the data collection mission areas based on a number of mission breaks allowed during the data collection mission;
   selecting, by the computing device, at least one of the data collection mission areas based on said prioritizing;
   generating, by the computing device, a route to be traversed by the at least one robotic device in the selected at least one data collection mission area, the route being configured to cause the robotic device to traverse each two-way road of a plurality of two-way roads at least one time in two opposing directions;

causing, by the computing device, the at least one robotic device to perform the data collection mission by following the route and collecting data;

causing, by the computing device, the at least one robotic device to discontinue collecting data in response to a trigger event; and using, by the computing device, the data collected during the data collection mission to generate or update the map information;

wherein the at least one data collection mission area is identified based on at least one of a total number of data collection mission areas for the geographic location, a location of a terminal or depot where the at least one robotic device resides prior to the data collection mission, and a number of mission breaks of a threshold duration that can occur during the data collection mission.

2. The method according to claim 1, further comprising using the map information to facilitate controlled movement of a vehicle.

3. The method according to claim 1, further comprising performing operations by the computing device to ensure that the at least one data collection mission area complies with a rule that states the data collection mission area is not to include at least one of a parking lot, an alley and a driveway.

4. The method according to claim 1, further comprising performing operations by the computing device to ensure that the route complies with at least one rule that states the route should cause the at least one robotic device to travel straight through traffic lights when possible.

5. The method according to claim 1, further comprising updating the route as the at least one robotic device performs the data collection mission based on at least one of traversal history of the at least one robotic device, a location of the robotic device, and an inferred existence of route blockage or obstruction.

6. The method according to claim 1, further comprising:
updating the route as the at least one robotic device performs the data collection mission based on an annotation made to a map during the data collection mission;
wherein the annotation comprises a movable graphical object having a variable style selected from a plurality of possible styles defined to respectively convey different information; and
wherein one of the plurality of possible styles is defined to convey first information comprising (a) an inaccessible road or other travelable area, (b) a road or other travelable area for which data could not be collected during the data collection mission, (c) an undesirable area of operation, (d) an area not legal to drive, or (e) a travelable area with an improperly functioning traffic control measure.

7. The method according to claim 1, further comprising updating the route in response to an addition of a new annotation to the map or a modification of an existing annotation to the map.

8. The method according to claim 1, further comprising displaying information showing parts of the data collection mission area for which data has been collected.

9. The method according to claim 1, further comprising causing (i) data collection operation of the at least one robotic device to be suspended or disabled when the at least one robotic device begins to traverse a road an additional time and (ii) the data collection operations to be unsuspended or re-enabled when the at least one robotic device completes traversal of the road the additional time.

10. The method according to claim 1, wherein the trigger event comprises detection of a malfunction or other operational fault of the at least one robotic device.

11. A system, comprising:
a processor;
a non-transitory computer-readable storage medium comprising programming instructions that are configured to cause the processor to implement a method for generating and using map information, wherein the programming instructions comprise instructions to:
identify data collection mission areas within a geographic location that are to be covered by a at least one robotic device during a data collection mission;
prioritize the data collection mission areas based on a number of mission breaks allowed during the data collection mission;
select at least one of the data collection mission areas based on said prioritizing;
generate a route to be traversed by the at least one robotic device in the selected at least one data collection mission area, the route being configured to cause the robotic device to traverse each two-way road of a plurality of two-way roads at least one time in two opposing directions;
cause the at least one robotic device to perform the data collection mission by following the route and collecting data;
cause the at least one robotic device to discontinue collecting data in response to a trigger event; and
use the data collected during the data collection mission to generate or update the map information;
wherein the at least one data collection mission area is identified based on at least one of a total number of data collection mission areas for the geographic location, a location of a terminal or depot where the at least one robotic device resides prior to the data collection mission, and a number of mission breaks of a threshold duration that can occur during the data collection mission.

12. The system according to claim 11, wherein the programming instructions further comprise instructions to use the map information to facilitate controlled movement of a vehicle.

13. The system according to claim 11, wherein the programming instructions further comprise instructions to perform operations to ensure that the at least one data collection mission area complies with a rule that states the data collection mission area is not to include at least one of an unmapped parking lot, an alley and a driveway.

14. The system according to claim 11, wherein the programming instructions further comprise instructions to ensure that the route complies with at least one rule that states the route should cause the at least one robotic device to travel straight through traffic lights when possible.

15. The system according to claim 11, wherein the programming instructions further comprise instructions to update the route as the at least one robotic device performs the data collection mission based on at least one of traversal history of the at least one robotic device, a location of the robotic device, and an inferred existence of route blockage or obstruction.

16. The system according to claim 11, wherein the programming instructions further comprise instructions to update the route in response to an addition of a new annotation to the map or a modification of an existing annotation to the map.

17. The system according to claim 11, wherein the programming instructions further comprise instructions to cause (i) data collection operation of the at least one robotic device to be suspended or disabled when the at least one robotic device begins to traverse a road an additional time and (ii) the data collection operations to be unsuspended or re-enabled when the at least one robotic device completes traversal of the road the additional time.

18. A non-transitory computer-readable medium that stores instructions that is configured to, when executed by at least one computing device, cause the at least one computing device to perform operations comprising:
   identifying data collection mission areas within a geographic location that are to be covered by at least one robotic device during a data collection mission;
   prioritizing the data collection mission areas based on a number of mission breaks allowed during the data collection mission;
   selecting at least one of the data collection mission areas based on said prioritizing;
   generating a route to be traversed by the at least one robotic device in the selected at least one data collection mission area, the route being configured to cause the robotic device to traverse each two-way road of a plurality of two-way roads at least one time in two opposing directions;
   causing the at least one robotic device to perform the data collection mission by following the route and collecting data;
   causing the at least one robotic device to discontinue collecting data in response to a trigger event; and
   using the data collected during the data collection mission to generate or update the map information;
   wherein the at least one data collection mission area is identified based on at least one of a total number of data collection mission areas for the geographic location, a location of a terminal or depot where the at least one robotic device resides prior to the data collection mission, and a number of mission breaks of a threshold duration that can occur during the data collection mission.

19. The method according to claim 1, further comprising selectively applying a rule for automatically scheduling the data collection mission when there has been a change to one or more road features of one or more particular types.

20. The method according to claim 1, further comprising performing operations by the computing device to ensure that the at least one data collection mission area complies with a rule that states the data collection mission area can include unmapped parking lots, alleys and driveways.

21. The method according to claim 6, wherein another one of the plurality of different possible styles is defined to convey second information that is different from the first information.

22. The method according to claim 6, further comprising:
   determining that a current style of the movable graphical object does not accurately convey contents of sensor data generated by sensors of the at least one robotic device during the data collection mission; and
   automatically changing one or both of (i) the current style of the movable graphical object and (ii) a location of the movable graphical object on the map, based on the sensor data.

23. The method according to claim 22, further comprising prompting an individual to accept or reject an automatic change to one or both of the current style and location of the movable graphical object.

* * * * *